Sept. 10, 1963  G. R. ENGLUND  3,103,309
DATA HANDLING APPARATUS
Filed Feb. 3, 1960  7 Sheets-Sheet 1
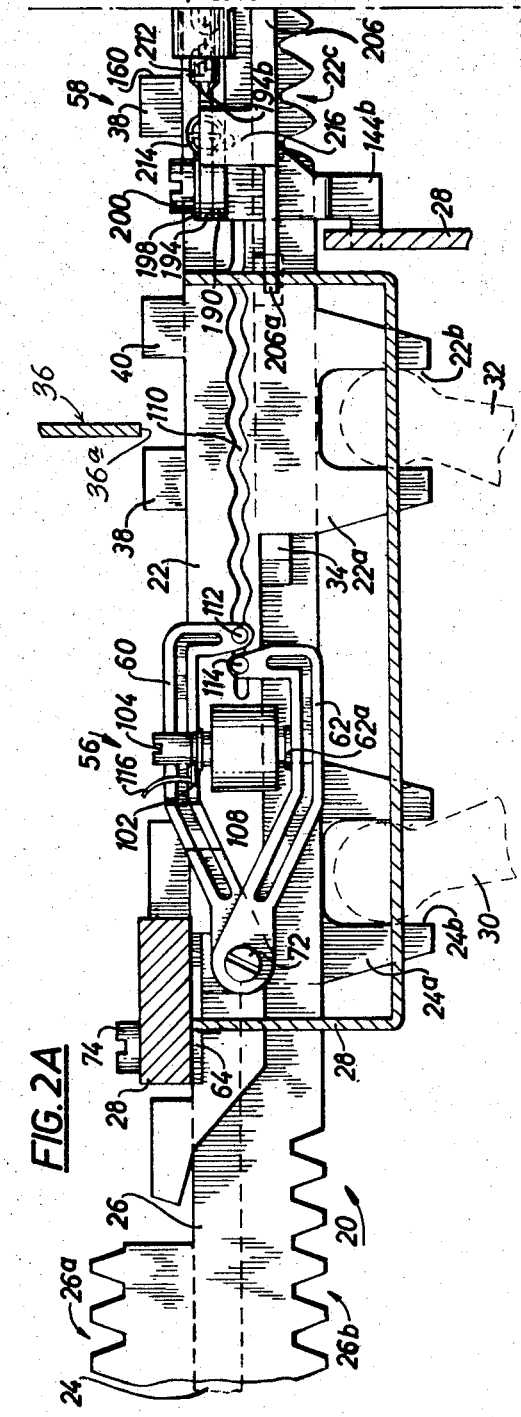
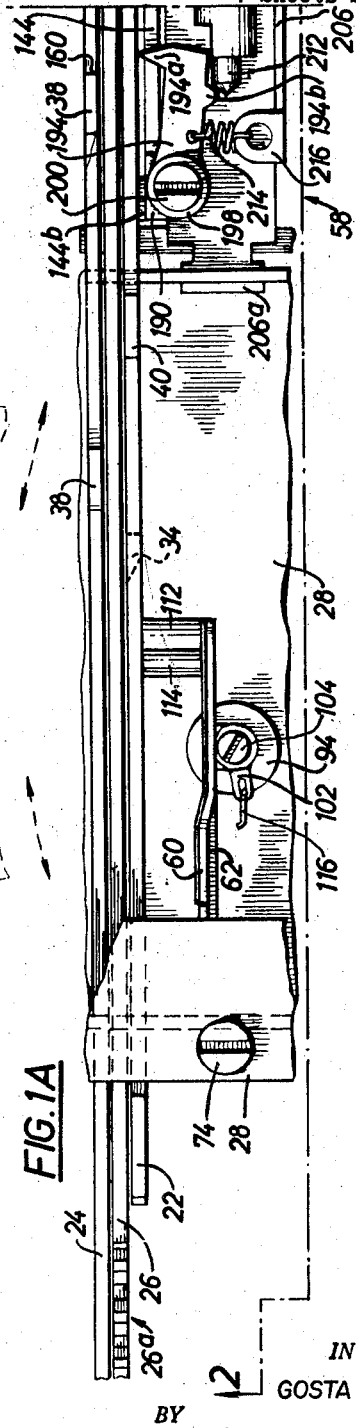
INVENTOR.
GOSTA R. ENGLUND
BY
Mason, Kolehmainen, Rathburn and Wyss.
ATTORNEYS

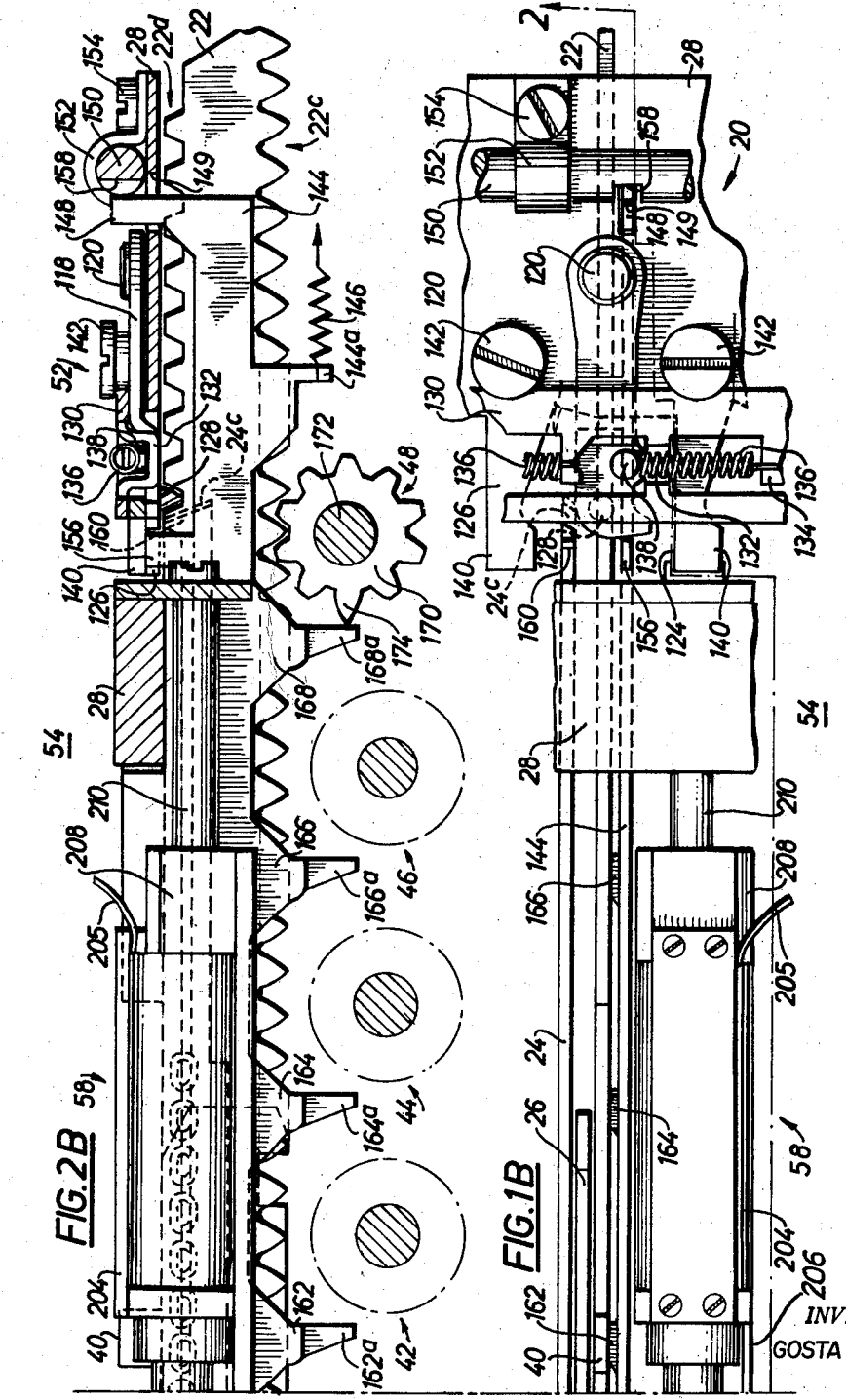

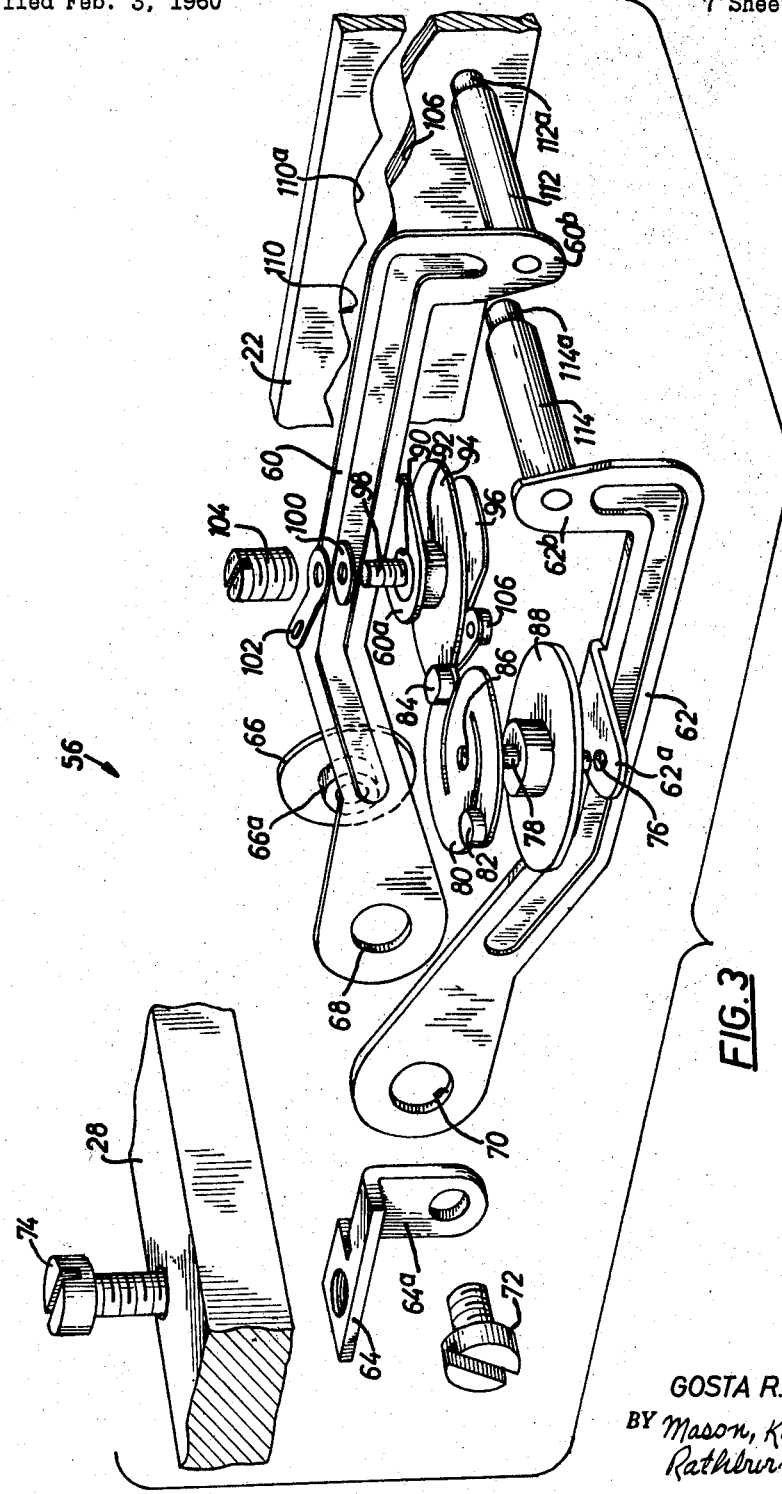

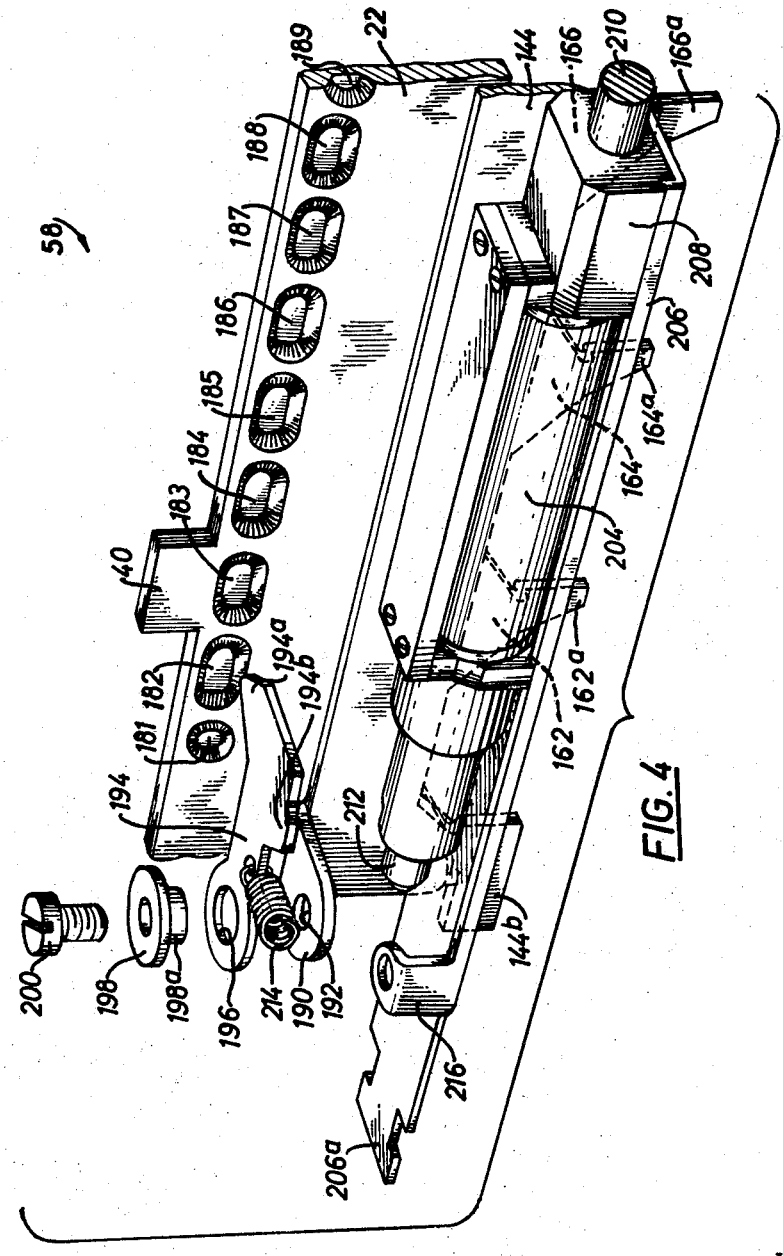

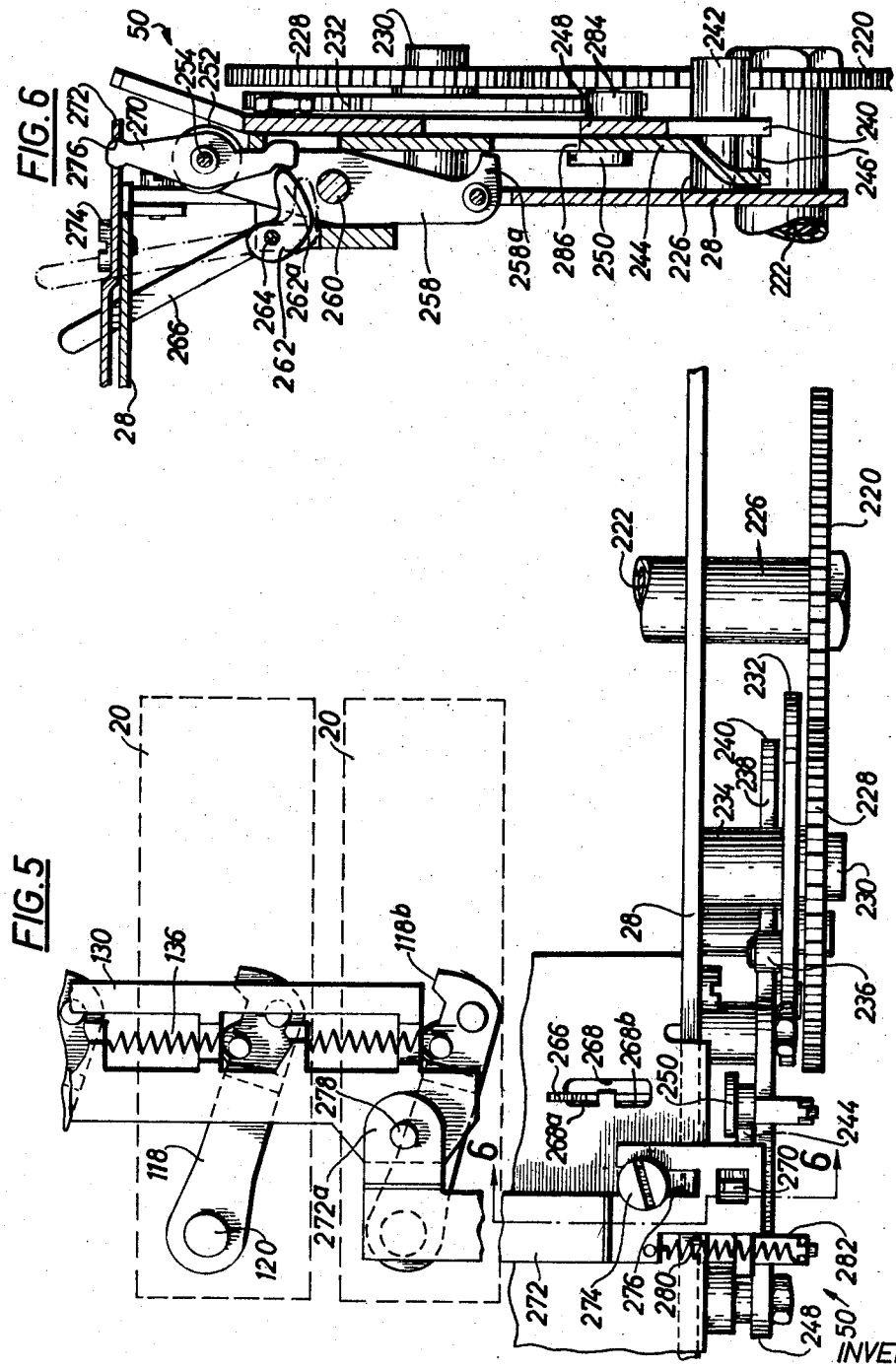

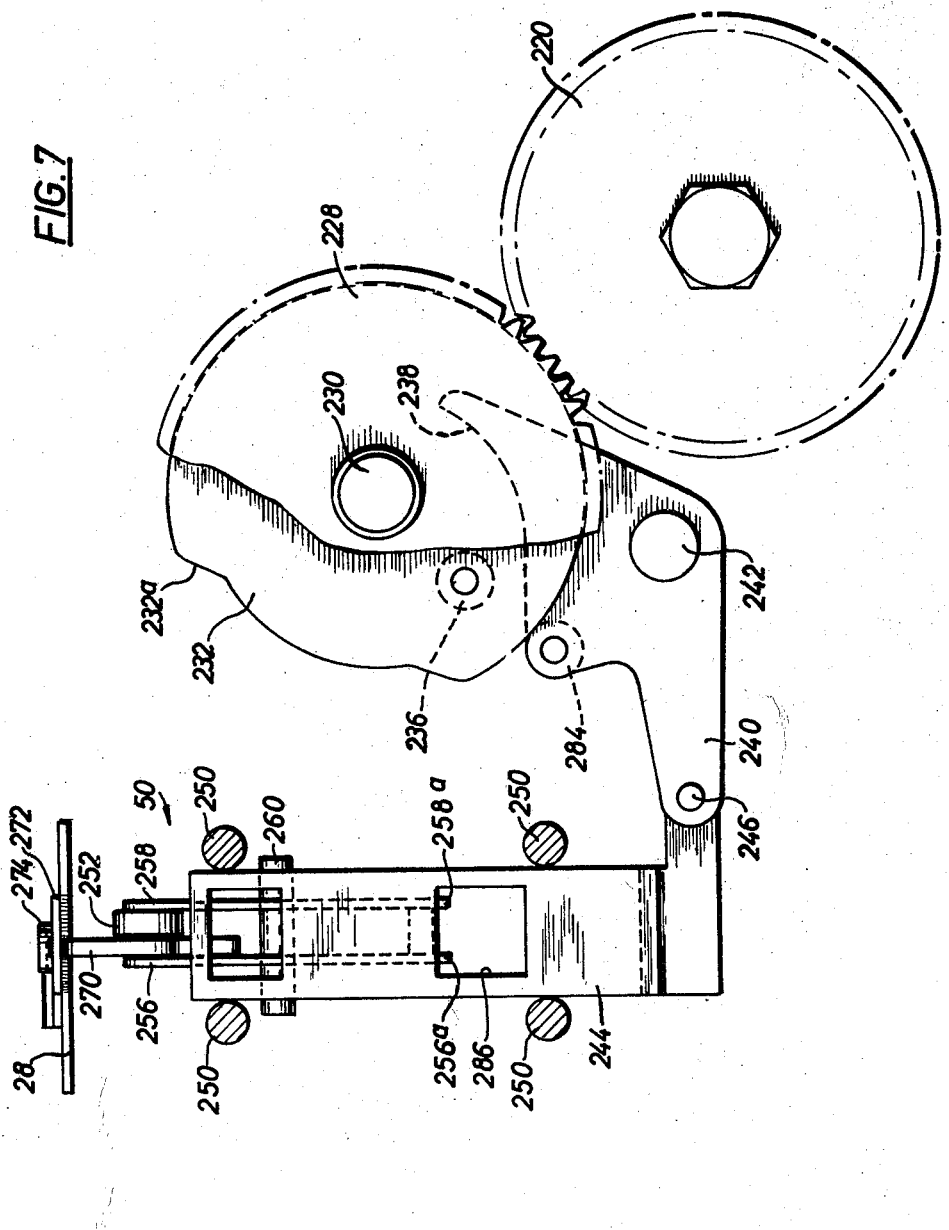

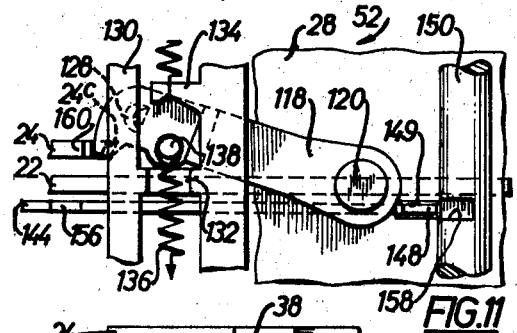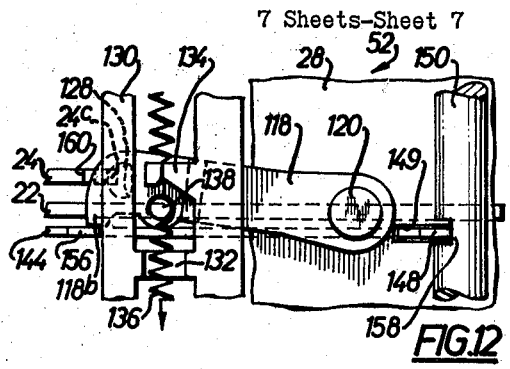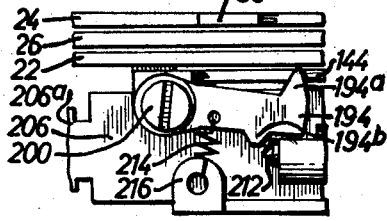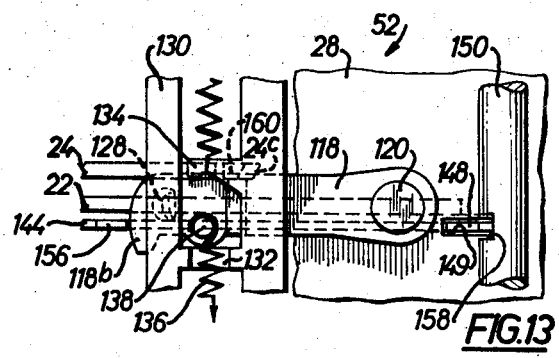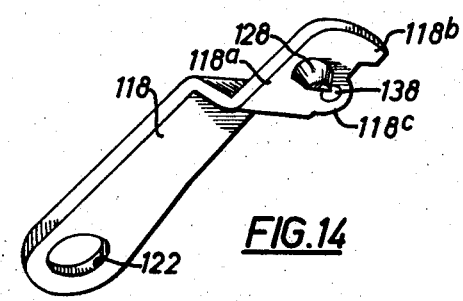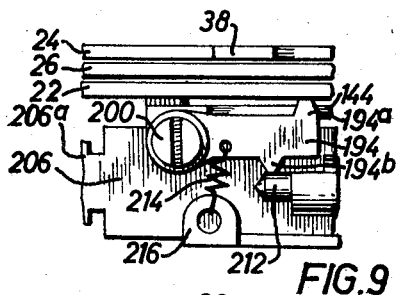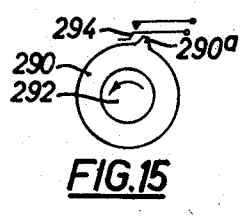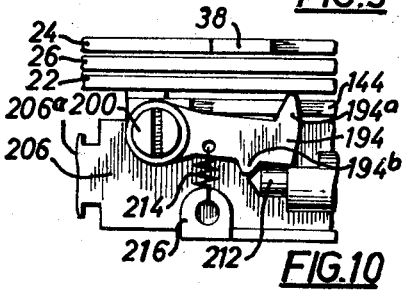

United States Patent Office 3,103,309
Patented Sept. 10, 1963

3,103,309
DATA HANDLING APPARATUS
Gosta Roland Englund, Stockholm, Sweden, assignor to Svenska Dataregister AB, Stockholm, Sweden, a corporation of Sweden
Filed Feb. 3, 1960, Ser. No. 6,522
27 Claims. (Cl. 235—60.31)

This invention relates to a data handling apparatus and, more particularly, to an apparatus including new and improved means for adjusting a differentially settable element.

Many types of data handling and accounting equipment include differentially settable elements, such as racks, slides, or gear segments, that are adjusted to different digit representing positions in accordance with entered data items. In cash registers, for instance, the depression of a key representing a digit of an amount is commonly used to arrest movement of a differentially settable element in a position representing the entered digit. The copending application of Gunnar E. Sundblad, Serial No. 825,177, filed July 6, 1959, which application is assigned to the same assignee as the present application, discloses a system for transferring digital data between a cash register, an external electronic control and register means. In this system, the electronic register means can be located in a remote location, and the operation of the cash register is electrically controlled from the remote location.

Accordingly, one object is to provide a new and improved data handling apparatus.

Another object is to provide a data handling apparatus including new and improved means for controlling the movement of a differentially settable element.

A further object is to provide a data handling apparatus capable of manual and electrical control.

A further object is to provide data handling apparatus including selecting means for permitting differentially settable elements to be adjusted in two different manners.

Another object is to provide an electrically operated means for reading data into and removing data from a data processing unit, such as a cash register.

A still further object is to provide a cash register including differentially settable elements in which the differentially settable elements control signal generating means to supply electrical signals representing movements of the elements and in which movements of the elements to data representing positions are controlled by electrically operated means.

Another object is to provide data handling apparatus including a pair of differentially settable elements in which detent means are provided for blocking movement of one and then the other of the pair of differentially settable elements.

A further object is to provide data handling apparatus including new and improved means for arresting movement of a differentially settable element.

In accordance with these and many other objects, an embodiment of the invention comprises a data handling unit, such as a cash register, that includes a plurality of control assemblies or mechanisms that are adjusted to various digit or function representing positions for controlling the transfer of information into and out of the cash register. These control assemblies or mechanisms are capable of manual control by the use of a conventional keyboard or of remote electrical control by a system of the type described in detail in the above identified Sundblad application.

Each of the control assemblies is of the general type disclosed in the copending application of Gosta R. Englund, Serial No. 633,947, filed January 14, 1957, now Patent No. 3,040,978, which copending application is assigned to the same assignee as the present application.

As described therein, each control assembly includes an accumulator rack or slide and a complementary rack or slide which are differentially settable to complementary data representing positions to control the setting of an indicator rack that is interposed therebetween. The upper edges of the differentially settable elements are provided with a plurality of stop elements, and these two elements are driven in opposite directions by a mechanism actuated by the main shaft of the cash register.

When data is to be manually entered into the cash register, a selected one of the digit or function representing keys is depressed so that a portion thereof is disposed in the path of movement of a stop on each of the accumulator and complementary slides. When the cash register is placed in operation, the accumulator and complementary slides are moved in opposite directions until the two stops engage opposite sides of the depressed key. During this complementary movement, the indicator rack is shifted by engagement with the driven slides so that its final position represents the desired function or digit. The indicator rack is connected to drive means for setting suitable indicating or recording means. The cash register then returns the accumulator and complementary slides to their normal positions.

To permit information to be entered into the cash register by electrically controlled means, each of the differential assemblies includes both a signal generator for supplying signals representing movement of the accumulator slide and a stop assmebly controlled by an electrical signal received from an external data handling system for arresting movement of the accumulator rack in a position representing the entered data item. The signal generator comprises contact means periodically actuated by cam followers engaging a control cam track formed in the accumulator rack for providing a pulse for each increment of movement of the accumulator rack. When the accumulator rack is moved at the beginning of an item entering operation, the signal generator provides output signals representing increments of movement of the accumulator rack to an external control circuit of the type shown in the copending Sundblad application. When the signals received from the signal generator representing movement of the accumulator rack correspond to the desired setting directed by the external control circuit, this circuit returns an electrical signal to energize the stop assembly, thereby to arrest further movement of the accumulator rack.

The stop assembly performs two separate functions. Since it is desirable to synchronize the movement of the accumulator rack with a particular portion of the operating cycle of the cash register, the stop assembly includes a detent or latch means that is released at the initiation of a cycle of operation of the cash register to be moved to a position in which it blocks movement of the complementary rack or slide. Thus, when the drive means for the differential assembly is rendered effective, the complementary slide is blocked against movement and only the accumulator slide can be moved. When the stop signal is received from the external control circuit, the stop assembly is actuated to momentarily connect a control link to the moving accumulator rack. This movement of the link shifts the detent or latch means out of a position blocking movement of the complementary slide and into a position locking the accumulator slide in the setting determined by the received stop signal. Thus, the stop assembly locks the accumulator slide in a data item representing position and frees the complementary slide for movement to a position complementary to that of the locked accumulator slide. The stop assembly is rendered ineffective at a subsequent point in the operating cycle, and the complementary and accumulator slides are returned to a normal position.

When information is to be electrically transferred from the accumulating means in the cash register to either the external control circuit or the indicator racks, an accumulator or totalizer gear is moved into engagement with a toothed portion on the accumulator rack, and the stop assembly is rendered effective by moving the detent or latch means into alignment with the complementary rack or slide to block its movement. Thus, when the main shaft actuates the drive means for the differential unit, the accumulator gear is driven by the accumulator rack to a normal setting so that the value previously stored in the position of the gear has now been transferred to a corresponding setting of the accumulator rack. A means driven in synchronism with movement of the accumulator gear, such as an enlarged tooth thereon, actuates the control link when the gear reaches its normal position so that the detent or latch means is shifted to arrest further movement of the accumulator slide and to free the complementary slide for movement to a position complementary to the setting in which the accumulator slide has been arrested. During the movement of the accumulator slide, the signal generator provides a signal representing the data item stored in the gear, and during the following movement of the complementary slide, the setting of the indicator rack to a position determined by the initial gear position is completed.

Since the complementary and accumulator slides in all of the differential units are to be free for concurrent movement when data items are entered into the cash register by manual actuation of the keyboard assembly and are to be sequentially moved when data items are electrically read into or out of the cash register, the cash register includes selectively operated control means for either rendering the plurality of stop assemblies effective or ineffective in accordance with the nature of the data handling operation to be performed. To accomplish this, the cash register includes a selector unit for rendering the plurality of detent means effective or ineffective. The selector unit is controlled by a manually adjustable lever and is driven by the main shaft of the cash register in synchronism with the actuation of the plurality of differential assemblies.

Many other objects and advantages of the present invention will become apparent from the following detailed description when considered in conjunction with the drawings in which:

FIGS. 1A and 1B form a top elevational view of a single differential control unit or assembly embodying the present invention;

FIGS. 2A and 2B form a sectional view taken along line 2—2 in FIG. 1;

FIG. 3 is an exploded perspective view of a signal generator included in the differential control unit;

FIG. 4 is an exploded perspective view of an electrically controlled clutch assembly included in the differential control unit;

FIG. 5 is a top plan view of a selector unit for controlling the effectiveness of a plurality of stop assemblies;

FIG. 6 is a sectional view taken along line 6—6 in FIG. 5;

FIG. 7 is a front elevational view in partial section of the unit shown in FIGS. 5 and 6;

FIG. 8 is a fragmentary plan view of a portion of the clutch assembly shown in its normal position;

FIG. 9 shows the clutch assembly of FIG. 8 in an actuated condition;

FIG. 10 shows the clutch assembly of FIG. 8 in a released condition following actuation and before restoration to its normal position;

FIG. 11 illustrates a detent means included in the differential control unit in its normal position;

FIG. 12 illustrates the detent means shown in FIG. 11 in a position blocking movement of a complementary slide;

FIG. 13 shows the detent means of FIG. 11 in a position arresting movement of an accumulator slide and freeing the complementary slide;

FIG. 14 is a perspective view of a latching arm included in the detent means shown in FIGS. 11–13; and FIG. 15 is a schematic diagram of a cam controlled contact means.

In general, the present invention comprises a data handling or processing apparatus, such as a cash register, that includes a plurality of differential control units 20 (FIGS. 1 and 2) for controlling the transfer of data items into and out of the cash register. The differential control units 20, which preferably are of the type disclosed in detail in the copending Englund application, are used not only for handling digital data, but also items of information for controlling the type or mode of operation of the cash register. As described in detail in the copending Englund application, each of the differential control units 20 includes an accumulator rack or slide 22, a complementary slide or rack 24, and an indicator rack or slide 26 that are mounted on a supporting frame 28 of the cash register for translatory movement. The accumulator slide 22 and the complementary slide 24 are driven in opposite directions during predetermined portions of the cycle of revolution of a main shaft of the cash register by a differential drive means which is shown in the copending Englund application and which includes a pair of drive elements 30 and 32 (FIG. 2A) that are received within a pair of openings 22b and 24b formed in depending portions 22a and 24a on the accumulator slide 22 and the complementary slide 24, respectively. The indicator slide 26, which includes toothed portions 26a and 26b at one end thereof for driving conventional indicating and recording means, is freely movable relative to the slides 22 and 24. The indicator slide 26 is set in a data representing position by the complementary settings of the slides 22 and 24 by means of oppositely extending projections adapted to engage the right-hand edge of the depending portion 24a on the complementary slide 24 (FIG. 2A) and the left-hand edge of the depending portion 22a (FIG. 2A) on the accumulator slide 22. In FIG. 2A, a projection 34 adapted to engage the left-hand edge of the depending portion 22a is illustrated.

When the indicator slide 26 and the slides 22 and 24 are to be set to a data representing position under the control of the manually actuated keyboard assembly in the cash register, a selected one of a plurality of keys 36 is actuated so that a portion 36a (FIG. 2A) thereof is interposed in the path of movement of one of three stop projections 38 located at spaced positions on the upper edge of the complementary slide 24 and in the path of movement of one of three stop projections 40 located at three spaced positions along the upper edge of the accumulator slide 22. During subsequent setting movements of the differential control assembly 20, the main shaft of the cash register moves the slide 24 to the right and the slide 22 to the left (FIGS. 1A and 2A) so that the opposite edges of two of the stop projections 38 and 40 engage the interposed portion 36a of the depressed key 36 to arrest movement of the slides 22 and 24 in complementary positions representing the value of the entered digit or data item. During this movement of the slides 22 and 24, the indicator slide 26 is set to a position representing the entered item so that the indicating and recording means controlled thereby are adjusted to similar positions. Further, the accumulator slide 22 includes a lower tooth portion 22c with which a selected one of a plurality of accumulator assemblies 42, 44, 46 and 48 can be engaged so that the value entered into the cash register is also entered into the accumulator. The setting of the slides 22, 24 and 26 and of the accumulators 42, 44, 46 and 48 can be performed in the general manner described in detail in the copending Englund application.

When an item of information is to be stored in the cash register under electrical control, the differential units 20 are controlled by an external control circuit of the type described in the copending Sundblad application which includes a plurality of registers in which the data items to be entered are stored. When information is to be entered into the cash register by electrical control, a manually controlled selector unit 50 (FIGS. 5-7) is operated to an electrical control setting, and the cash register is placed in operation under the control of the external control circuit. During the initial portion of the cycle of rotation of the control shaft, the control unit 50 is actuated to move a plurality of detent means 52 forming parts of a plurality of stop assemblies 54 to effective positions in which all of the complementary slides 24 in all of the differential control units 20 are blocked against movement. Thus, when the drive shaft is advanced to the point at which the movement of the slides 22 and 24 is initiated, only the accumulator slides 22 are free to move. In moving, the accumulator slides actuate signal generators 56 in all of the units 20 so that series of pulses proportional in number to the increments of movement of the associated accumulator slides 22 are transmitted to the external control circuit.

When groups of pulses corresponding to the digits stored in the related registers in the external control circuit have been received thereby, these circuits return stop signals to a plurality of clutch assemblies 58 in the related stop assemblies 54. When the clutch assemblies 58 are actuated, the detent means 52 are operated to release the related complentary slides 24 and to lock the related accumulator slides 22 in positions representing the entered data items. The complementary slides 24 now move to their complementary positions, the necessary recording and indication operations are performed under the control of the set indicator slides 26, the clutch assemblies 58 are released, the detent means 52 are restored to a normal position by the selector unit 50, and the slides 22 and 24 are restored to their normal positions.

If data items stored in the accumulating means 42, 44, 46 or 48 in the cash register are to be transferred to the external control circuit or to the indicator slides 26, the control unit 50 is again actuated to the electrical control setting, and a cycle of operation of the cash register is initiated. During an initial portion of the cycle of rotation of the main shaft, the detent means 52 in the plurality of stop assemblies 54 are again operated to their first effective position in which movement of the complementary slides 24 is blocked. Thereafter, spaced gears in one of the accumulator means 42, 44, 46 and 48 is engaged with the toothed portions 22c on the accumulator slides 22, and these slides are advanced by the drive means. When the accumulator slides 22 are advanced to settings representing the information stored in the engaged accumulator means, an enlarged tooth on each of the accumulator gears engages a related control link to operate the detent means 52 so that the complementary slides 24 are freed for movement and the accumulator slides 22 are locked against further movement.

During the preceding movements of the accumulator slides 22, the pulse generating assemblies 56 are operated to transmit series of pulses proportional to the values of the data items stored in the selected accumulator means to the external registers. The movements of the slides 22 and 24 also set the indicator slides 26. During the remaining portion of the cycle of rotation of the main shaft, the plurality of detent means 52 are rendered ineffective under the control of the selector unit 50, and the slides 22 and 24 in all of the differential control units 20 are restored to their normal positions. The engagement of the selected accumulator means with the accumulator slides 22 is so controlled that this readout operation can either clear the data items from the accumulator means or return these items to the accumulator means.

Referring now more specifically to the signal generators 56, each of the differential control units 20 includes one of the signal generators 56 (FIGS. 1, 2 and 3) to provide a series of discrete pulses equal in number to the steps or increments of movement of the related accumulator slide 22. If the differential control unit 20 is used, for instance, to enter decimal digits into the cash register, the accumulator slide 22 has a normal or "0" representing position and nine successive spaced positions representing the digits "1"-"9," inclusive. Thus, the signal generator 56 operates to provide nine pulses if the accumulator slide 22 is moved to a "9" representing position from its normal position. A pulse or signal is not produced for an item having a value of "0."

Each of the signal generators 56 includes a pair of cam follower arms 60 and 62 that are pivotally mounted on a depending arm 64a of a bracket 64 by a washer 66 having a cylindrical boss 66a which is received within a pair of openings 68 and 70 in the follower arms 60 and 62 and which threadedly receives a machine screw 72. The bracket 64 is secured to the supporting frame 28 by a machine screw 74 so that the cam follower arms 60 and 62 are pivotally mounted in a position generally parallel to, but spaced from the accumulator slide 22.

To provide signal generating means, each of the cam follower arms 60 and 62 carries electrical contact means that are intermittently moved into engagement in response to movement of the related accumulator slide 22. The lower cam follower arm 62 includes an outwardly projecting lug 62a having an opening 76 in which is received the lower end of an electrically conductive pin 78. The upper end of this pin is secured to a somewhat S-shaped resilient contact carrier 80 to the opposite ends of which are secured a pair of upwardly extending contact elements 82 and 84. The upper end of the pin 78 is received within an opening 86 formed in the contact carrier 80 and the lower surface of this carrier rests on the upper annular surface of a boss formed on a circular dielectric plate 88.

The upper cam follower arm 60 also includes an outwardly extending lug 60a defining an enlarged opening 90 within which the reduced upper diameter portion of an annular boss 92 formed on a second circular dielectric plate 94 is mounted. A second flexible and electrically conductive contact carrier 96 is secured to one end of a fastener 98. The upper end of the fastener 98 projects upwardly above the upper surface of the recessed diameter portion of the boss 92 to receive a dielectric washer 100 and an electrically conductive lug 102. An internally threaded fastener 104 is secured to the upper end of the fastener 98 to secure the contact carrier 96 on the lug 60a of the cam follower arm 60, but electrically insulated therefrom. A pair of depending contact elements 106, one of which is shown in FIG. 3, are secured to the opposite ends of the contact carrier 96, which is similar in configuration to the contact carrier 80, in alignment with the contacts 82 and 84. A suitable and somewhat flexible tubular dust cover 108 (FIG. 2A) is secured to the peripheral portions of the circular plates 88 and 94 to protect the contacts 82, 84 and 106 from dust and oil.

To provide means for periodically actuating the signal generator assemblies 56 by moving the contacts 82 and 84 into engagement with the pair of contacts 106 a number of times proportional to the steps or increments of movement of the accumulator slides 22, the accumulator slide 22 is provided with a generally sinusoidal or undulating cam track 110. A downwardly extending portion 60b of the upper cam follower arm 60 supports a cam follower pin 112 having a reduced diameter end portion 112a that is received within the cam track 110. Similarly, the lower cam follower arm 62 includes an upwardly extending portion 62b to which is secured a cam follower pin 114 having a reduced diameter end portion 114a that is received within the cam follower track 110. The pin 112 carried on the upper arm 60 is positioned within the track 180 a distance equal to substantially 180° or a half cycle of the waveform represented by the track 110 in advance of the cam follower pin 114 secured to the lower cam follower arm 62. Thus, when the cam follower pin 112 engages one of the uppermost surfaces in the track 110, the pin 114 will engage one of the lowermost surfaces in this track. In this position, the contact elements 82, 84 and 106 are spaced.

When the accumulator slide 22 is moved to the left in FIG. 2A so that the cam follower pin 112 moves downwardly to engage one of the lower surfaces in the track 110, the pin 114 is moved into engagement with one of the uppermost surfaces in the track 110. This movement of the cam follower pins 112 and 114 pivots the arm 60 in a clockwise direction (FIG. 2A) and the arm 62 in a counterclockwise direction. This moves the contacts 82 and 84 carried on the arm 62 into engagement with the pair of contacts 106 carried on the arm 60. During the succeeding movement of the accumulator slide 22, the pin 112 moves to a position engaging an uppermost surface of the track 110 and the pin 114 moves into engagement with a lowermost portion of the track 110. This movement pivots the arm 60 in a counterclockwise direction (FIG. 2A) and the arm 62 in a clockwise direction so that the contact elements 82 and 84 are moved out of engagement with the pair of contact elements 106. Thus, the conductive path between the contacts 82 and 84 is interrupted. Since the contacts 82 and 84 are connected to ground through the frame 28 of the cash register, a conductor 116 that is connected between an inlet to the external control circuit and the terminal 102 is provided with a number of ground pulses proportional to the distance through which the accumulator slide 22 has been moved. Thus, the generator 56 provides a signal representing the value or data item corresponding to the position of the slide 22.

Referring now more specifically to the stop assembly 54, this assembly is not used during the manual entry of information into the cash register by the use of the keyboard and is rendered ineffective during these operations by the selector unit 50. However, the stop assemblies 54 are used when a data entry is to be read out of the cash register accumulators to the external control circuit or the indicator racks 26 or when a data entry is to be transferred from the external control circuit to the cash register. The stop assembly 54 includes the detent means or assembly 52 that operates to block movement of the complementary slide 24 until movement of the accumulator slide 22 has been completed and then arrests movement of the accumulator slide 22 in the selected setting. The detent means 52 is moved to an effective position under the control of the selector unit 50 and is operated to free the complementary slide 24 and to lock the accumulator slide 22 under the control of either a selected one of the accumulator means 42, 44, 46 and 48 or the clutch assembly 58. The clutch assembly 58 also forms a part of the stop assembly 54 and is selectively operated by the external control circuit.

The detent assembly 52 (FIGS. 1, 2 and 11–14) comprises a latch or detent arm 118 that is pivotally mounted on the supporting frame 28 above the right-hand ends of the slides 22 and 24 (FIGS. 1B and 2B) by a headed fastener 120 that is pivotally received within an opening 122 (FIG. 14) in one end of the arm 118. A free end 118a of the arm 118 is downwardly offset to be received within an opening 124 (FIG. 1B) formed by adjacent ones of a plurality of fingers 126 that extend outwardly from an edge of the supporting frame 28. The end portion 118a includes a projecting portion 118b and supports a depending and generally rounded finger 128. The depending finger 128 is adapted to engage the end of the complementary slide 24 to prevent movement of this slide out of its normal positions and is also adapted to be moved into engagement with a toothed portion 22d on the accumulator slide 22 to arrest movement thereof.

To provide means for controlling the effectiveness or position of the detent arm 118, a slide 130 is provided whose position is determined by the selector unit 50. The slide 130 includes a plurality of generally U-shaped or depressed crosspieces 132 and a plurality of spaced, related fingers 134. A tension spring 136 is connected between each of the fingers 134 and a pin 138 secured to the upper surface of the end portion 118a on the arm 118, the spring 136 lying within the U-shaped crosspiece 132. To slidably mount the slide 130 on the supporting frame 28, one side thereof slidably engages the upper surfaces of the arms 118 (FIG. 2B) and the other side of this slide engages the upper surfaces of spaced elements 140 that are carried on the free ends of the fingers 126. The flanged heads and shanks on a plurality of fasteners 142, which can be disposed on opposite sides of the slide 130, engage the edges of the slide 130 to guide translatory movement thereof.

When the slide 130 is moved upwardly in FIG. 1B or to the right in FIGS. 11–13, the bight portions of the U-shaped crosspieces 132 engage rounded portions 118c on the end portions 118a to pivot the arms 118 in a clockwise direction (FIGS. 11–13) to their normal or "home" positions illustrated in FIG. 11. In this position, the depending finger 128 is moved out of alignment with the accumulator slide 22 and the complementary slide 24. However, when the slide 130 is moved downwardly in FIG. 1B or to the left in FIGS. 11–13, the tension springs 136 act on the arms 118 to pivot them in a counterclockwise direction around the fasteners 120 to either the position shown in FIG. 12 or the position shown in FIG. 13. In the position illustrated in FIG. 12, the finger 128 is aligned with the end of the complementary slide 24 and serves to block movement of the complementary slide 24 from its normal position. When the arm 118 is pivoted to the position shown in FIG. 13, the depending finger 128 engages the toothed portion 22d (see, for instance, FIG. 2B) to lock the accumulator slide 22 against movement. In this latter position, the finger 128 is not aligned with the end of the complementary slide 24, and this slide is free to move.

To provide means for controlling the movement of the latching arm 118 into one of the positions shown in FIGS. 12 and 13 when the stop assembly 54 is rendered effective by the selector unit 50, the stop assembly 54 includes a control slide or link 144 (FIGS. 1 and 2) that is slidably mounted on the supporting frame 28 for translatory movement parallel to and spaced from the accumulator slide 22. A tension spring 146 connected to a depending portion 144a (FIG. 2B) normally biases the control slide or link 144 to the right in FIG. 2B or downwardly in FIGS. 11–13. A downwardly and forwardly extending guide piece 144b formed integral with the control slide 144 is slidably received in an opening formed in a portion of the supporting frame 28 (FIG. 2A) to aid in slidably mounting the control slide or link 144 on the cash register.

In the normal condition of the cash register, an upstanding arm 148 at the right-hand end of the control slide 144 (FIG. 2B), which extends upwardly through a slot 149 in the frame 28, is biased against the outer periphery of a control shaft 150. This shaft is rotatably mounted on the supporting frame 28 by an arcuate bearing member 152 that is secured to the frame 28 by a headed fastener 154. The shaft 150 is rotated by a drive means, such as a gear train, that is actuated by the main shaft of the cash register. This rotation of the shaft 150 renders a second upstanding arm 156 on the control link 144 selectively effective to control the setting of the related detent arm 118.

When the cash register is placed in operation, the main shaft rotates the control shaft 150 to the position shown in FIGS. 2B, 12 and 13 in which a notch 158 therein is moved into alignment with the arm 148. This frees the control slide or link 144 for movement to the right in FIG. 2B or downwardly in FIGS. 11–13 so that, if the control slide 144 is not locked against movement, this slide moves to the position shown in FIG. 12 in which the upwardly projecting arm 156 is aligned with the projecting portion 118b on the latch arm 118. Accordingly, when the slide 130 is subsequently moved to the left in FIG. 12, the projecting portion 118b engages the upwardly projecting arm 156 to stop the latch arm 118 in the position illustrated in FIG. 12 in which the depending finger 128 is aligned with the end of the complementary slide 24 to block its downward movement. Accordingly, in response to rotation of the control shaft 150 and movement of the slide 130 to the left, the latch arm 118 is moved to an effective position determined by the control slide 144 in which movement of the complementary slide 24 is blocked.

When the control slide 144 is moved upwardly in FIGS. 11–13 or to the left in FIG. 2B under the control of one of the accumulator means 42, 44, 46 or 48 or the clutch assembly 58, the arm 156 is moved out of alignment with the projecting portion 118b on the latch arm 118. At this time, the tension spring 136 pivots the latch arm 118 in a counterclockwise direction to the position illustrated in FIG. 13. In this position, the depending finger 128 is moved out of alignment with the end of the complementary slide 24 to permit this slide to be moved by the drive means actuated by the main shaft. Further, in the position shown in FIG. 13, the depending finger 128 engages the toothed portion 22d on the accumulator slide 22 to arrest further movement of this slide and to lock it in a position representing the entered data item. Counterclockwise movement of the latch arm 118 to the position shown in FIG. 13 is limited by engagement of the protuberance 118c with the bight portion of the U-shaped crosspiece 132. It should be noted that an end portion 24c on the complementary slide 24 that is disposed adjacent the depending finger 128 is both inclined and tapered (FIGS. 2B and 11–13). If the latch arm 118 has not been moved to the position shown in FIG. 13 by the tension spring 136, the subsequent downward movement of the complementary slide 24 from the position illustrated in FIG. 12 causes the tapered and inclined end portion 24c to engage the rounded surface of the depending finger 128 to positively displace the latching arm 118 to the position shown in FIG. 13 in which the depending finger 128 engages one of the clearings in the toothed portion 22d.

After the complementary slide 24 has completed its movement and the remaining operations of the cash register are performed, the selector unit 50 moves the slide 130 to the right from the position shown in FIG. 13 to the position shown in FIG. 11. During this movement, the bight portion of the U-shaped crosspiece 132 engages the curved protuberance 118c to restore the latching arm 118 to its normal position (FIG. 11). In order to permit this return movement of the latching arm 118 under the control of the slide 130, the upper surface of the complementary slide 24 is provided with a recessed portion 160 (FIGS. 1 and 2) to provide a clearance for the depending finger 128. During the completion of the cycle of operation of the cash register and following the return of the latch arm 118 to its normal position, the control shaft 150 is rotated to the position shown in FIG. 11 in which the outer periphery of this shaft engages the upstanding arm 148 to displace it against the action of the spring 146 to its normal position in which the arm 156 is held out of alignment with the projection 118b on the latch arm 118.

As indicated above, the detent means 52 in the stop assembly 54 is operated to release the complementary slide 24 and to lock the accumulator slide 22 whenever the accumulator slide 22 has been set to a proper data representing position. This control is accomplished by shifting the control slide or link 144 to the left in FIGS. 1 and 2 or upwardly in FIGS. 11–13. The shifting movement of the control slide 144 is controlled by a selected one of the plurality of accumulator means 42, 44, 46 and 48 or by the clutch assembly 58. In order to provide means for shifting the slide or link 144 under the control of a selected one of the accumulator means, the lower edge of the control slide 144 is provided with four depending arms 162, 164, 166 and 168 (FIG. 2), each individually associated with one of the accumulator means 42, 44, 46 and 48, respectively. Since the control slide 144 is parallel to and spaced from the accumulator slide 22 and since the actuation of the control slide 144 is to be controlled by the same accumulating means used to control the accumulator slide 22 during a data readout operation, each of the depending arms 162, 164, 166 and 168 includes a lower end portion 162a, 164a, 166a and 168a that is offset to a position vertically aligned with the adjacent accumulator slide 22. As an example, the lower end portion 168a on the arm 168 is aligned with and positioned beneath the toothed portion 22c on the accumulator slide 22 immediately adjacent the accumulator means 48.

When the setting of the accumulator slide 22 is to be controlled by a selected one of the accumulating means 42, 44, 46 or 48, a selected one of the accumulating means is rendered effective by elevating a selected set of accumulator gears 170 into mesh with the toothed portions 22c on the accumulator slides 22 in a group of the differential control units 20. This is accomplished by elevating a common gear supporting shaft 172 by any suitable means. The cash register is then placed in operation so that the detent means 52 associated with the differential control units 20 are rendered effective by the selector unit 50 and the control shaft 150. Thus, the complementary slides 24 are blocked against movement by the latch arms 118, and the accumulator slides 22 are moved to the left (FIG. 2B) to rotate the selected set of accumulator gears 170. Each of these gears includes an elongated tooth 174 representing a "0" setting. Therefore, when any particular one of the accumulator gears 170 has been advanced from its digit representing position to a "0" setting by the movement of the toothed portion 22c, the related accumulator slide is in the stored digit representing position and the end of the elongated tooth 174 moves into sliding engagement with the lower end portion 168a of the depending arm 168. This shifts the control slide 144 to the left (FIG. 2B) against the action of the tension spring 146 so that the arm 156 is moved out of alignment with the projecting portion 118b on the related latch arm 118. The arm 118 is now shifted to the left by the tension spring 136 so that the depending finger 128 moves into a clearance in the toothed portion 22d to arrest further movement of the related accumulator slide 22 and to free the related complementary slide 24 for movement.

At the completion of the cycle of operation of the cash register, the detent means 52 is restored to an ineffective position in the manner described above and the accumulator shaft 172 is lowered to move the selected set of accumulator gears 170 out of engagement with the toothed portions 22c on the accumulator slides 22. When the detent assembly 52 is rendered ineffective and the accumulator means 48 is disengaged or rendered ineffective, the tension spring 146 restores the control slide 144 to its normal position engaging the periphery of the control shaft 150 (FIG. 11).

The position or actuation of the control slide or link 144 is also controlled by the clutch assembly 58 (FIGS. 1, 2 and 4). This assembly is used when data items are transferred from the external control circuit to the cash register and is operable to momentarily connect the control slide 144 to a moving accumulator slide 22 so that the control slide is moved to a position in which the latch arm 118 can move from the complementary slide blocking position shown in FIG. 12 to the accumulator slide latching position shown in FIG. 13. Thus, the electrically controlled clutch assembly 58 receives an operating signal from the external control circuit as soon as the accumulator slide 22 has been moved to a position representing the data item to be transferred into the cash register. To accomplish this operation, the accumulator slide 22 includes ten spaced depressions 181–189 which represent nine separate data representing settings of the accumulator slide 22 other than the normal or "home" position. As an example, if the control unit 20 is used to enter decimal digit information, the "home" or normal position of the slide 22 represents "0" and the depressions 181–189 represent the digits "1"–"9" inclusive.

To provide means for selectively interconnecting the accumulator slide 22 and the control slide or link 144, the left-hand (FIGS. 1A and 2A) or forward end of the slide 144 is provided with an outwardly projecting lug 190 including a threaded opening 192 (FIG. 4). A clutch arm 194 is pivotally mounted on the lug 190 by a bossed washer 198 including a cylindrical bearing portion 198a that is received in an opening 196 in the arm 194 and a headed fastener 200 that extends through the washer 198 to be threadedly secured within the opening 192. The clutch arm 194 includes an angularly formed end portion 194a that is adapted to be moved into engagement with a selected one of the spaced depressions 181–189. If desired, the bearing portion 198a of the washer 198 and the opening passing therethrough are eccentrically formed so that the pivot point of the clutch arm 194 can be adjusted to properly locate the clutch arm 194 relative to the accumulator slide 22.

To provide means for selectively moving the clutch arm 194 into momentary driving engagement with the accumulator slide 22, a solenoid 204 controlled by an input conductor 205 is provided. The solenoid 204 is mounted on a plate 206 having a front end portion 206a that is slidably mounted in a slot formed in the supporting frame 28 (FIGS. 1A and 2A). A block 208 carried on the rear end of the plate 206 threadedly receives one end of a lead screw 210, the other end of which is mounted in an opening in the frame 28 for rotary and not translatory movement. Thus, by adjusting the lead screw 210, the position of the frame 206 and thus that of the solenoid 204 relative to the clutch arm 194 can be adjusted.

The solenoid 204 includes an axially movable armature 212 having a conically formed outer end that is normally held in the position shown in FIG. 8 when the solenoid 204 is not energized. A cam surface or projecting portion 194b on the clutch arm 194 is normally biased into engagement with the outer end of the armature 212 by a tension spring 214 connected between the arm 194 and a lug 216 formed on the outer edge of the supporting frame or plate 206.

When the solenoid 204 is energized in response to the receipt of a signal from the external control circuit indicating that the accumulator slide 22 has been adjusted to a proper data representing position, the armature 212 is moved upwardly from the position shown in FIG. 8 to the position shown in FIG. 9. In so moving, the tapered end of the armature 212 cams against the projection 194b on the clutch arm 194 to pivot this arm in a counterclockwise direction around the fastener 200 so that the projection 194a moves into one of the depressions 181–189. Since the accumulator slide 22 is moving to the left (FIGS. 1 and 2) or upwardly (FIGS. 8–10) the clutch arm 194 and the control slide 144 to which it is connected, are also moved upwardly. In moving upwardly, the projecting portion 194b slides along the outer edge of the armature 212, which is fixed in position, until the end thereof is reached. At this time, the tension spring 214 pivots the clutch arm 194 in a clockwise direction to the position illustrated in FIG. 10 in which the control slide or link 144 is disconnected from the accumulator slide 22.

As described above, this upwardly directed movement of the control slide 144 (FIGS. 8–13) moves the arm 156 out of engagement with the projecting portion 118b on the detent arm 118 so that the depending finger 128 moves out of alignment with the complementary slide 24 and into interlocking engagement with the toothed portion 22d on the accumulator slide 22 to lock this slide in a proper data item representing position. The upper end (FIG. 13) of the arm portion 118a engages the arm 156 to prevent it from being returned by the spring 146. When the solenoid 204 is released and the selector unit 50 and the shaft 150 are returned to normal positions, the detent arm 118 is restored to its normal position and the tension spring 146 restores the control slide 144 to its normal position (FIGS. 8 and 11) so that the clutch arm 194 is also restored to its normal position (FIG. 8). Thus, the clutch assembly 58 is operated under the control of the external control circuit to arrest the movement of the accumulator slide 22 in a data representing position by momentarily coupling the control slide or link 144 to the moving accumulator slide 22.

The selector unit 50 (FIGS. 5–7) selectively renders the stop assemblies 54 effective or ineffective. When data is entered into the cash register by manual actuation of the keyboard, the movements of the accumulator slides 22 and the complementary slides 24 in all of the differential units 20 are controlled by the engagement of the stops carried thereon with a mechanism actuated by the depressed keys. Thus, both the complementary and the accumulator slides are free to move. However, when data is to be transferred to the external control circuit or the indicator racks 26 from the accumulator means or from the registers in the external control circuit to the accumulator slides 22, the stop assemblies 54 are effective to permit movement of the accumulator slides 22 followed by movement of the complementary slides 24. This control is exercised by the selector unit 50 which is actuated by the main shaft of the cash register and which is conditioned for rendering the stop assemblies 54 effective or ineffective in accordance with the setting of a manually adjustable element.

More specifically, the effectiveness of the stop assemblies 54 is controlled by the setting of the plurality of detent assemblies 52, and these assemblies are in turn rendered effective and ineffective under the control of the shiftable slide 130. To provide means for shifting the slide 130 in those operations in which the stop assemblies 54 are to be effective, a drive gear 220 is secured to a main shaft 222 in the cash register, the gear 220 being spaced from the supporting frame 28 by a tubular sleeve 226. The drive gear 220 meshes with another gear 228 that is rotatably mounted on the frame by a stub shaft 230. A cam 232 is secured to the gear 228, and this gear is spaced from the frame 28 by a sleeve 234. When the gear 228 is rotated by the gear 220, a roller 236 carried on one face of the cam 232 engages an arcuate cam surface 238 on a rocker arm 240 that is pivotally mounted on the frame 28 by a stub shaft 242. The rocker arm 240 is pivotally connected to one end of a slide plate 244 by a pivot pin 246.

The slide plate 244 is slidably mounted on a supporting plate 248 by a plurality of headed fasteners 250, the shanks and heads of which engage the edges and outer surface of the slide plate. Accordingly, when the rocker arm 240 is pivoted in a clockwise direction by engagement with the moving roller 236, the slide 244 is moved upwardly (FIGS. 6 and 7) so that the upper end thereof engages a roller 252 carried on a shaft 254 joining a pair of parallel arms 256 and 258. The arms 256 and 258 are pivotally mounted on a supporting shaft 260 so that these arms and the shaft 254 are pivoted in a counterclockwise direction (FIG. 6) in response to the upward movement of the slide plate 244. This movement of the parallel arms 256 and 258 is used to control the position of the slide 130 in accordance with the setting to which the manual control for the selector assembly 50 is adjusted.

The manual control includes a cam 262 that is secured to a rotatably mounted shaft 264. A lever 266 is also secured to the shaft and includes an upper end portion that extends upwardly through an opening 268 in the supporting frame 28. The opening 268 is provided with two notched detent portions 268a and 268b for retaining the lever 266 in either of two adjusted positions. When the lever 266 is shifted to the position shown in full line in FIG. 6, the stop assemblies 54 are rendered effective by the selector assembly 50. Alternatively, if the lever 266 is shifted to the dashed line position illustrated in FIG. 6, the stop assemblies 54 are ineffective.

Assuming that the lever 266 has been manually actuated to the position shown in FIG. 6, a protuberance 262a on the control cam 262 is positioned adjacent the lower end of a link 270 that is pivotally mounted on the shaft 254. The upper end of the link 270 is received within an opening formed in a member 272 that is slidably mounted on the supporting frame 28 by a headed fastener 274 (FIG. 5) having a shank portion that cooperates with a slot 276 formed in the member 272. When the pair of arms 256 and 258 is pivoted in a counterclockwise direction (FIG. 6), the lower end of the link 270 bears against the protuberance 262a on the cam 262 so that the upper end of the link 270 moves with the arms 256 and 258 to shift the member 272 to the left as shown in FIG. 6 or upwardly as shown in FIG. 5. A projecting portion 272a on the member 272 is connected to the slide 130 by a pin 278. Thus, when the member 272 is moved upwardly in FIG. 5, the slide 130 is also moved upwardly to operate the plurality of detent assemblies 52 associated with the various differential units 20 to the positions illustrated in FIGS. 12 and 13.

If the lever 266 is adjusted to the position shown in dotted outline in FIG. 6, the protuberance 262a on the cam 262 is moved out of alignment with the lower end of the link 270. Thus, when the arms 256 and 258 are pivoted about the shaft 260 in a counterclockwise direction, a tension spring 280 connected between a lug 282 on the plate 248 and the member 272 prevents movement of the upper end of the link 270, and the link is free to pivot about the axis of the shaft 254 in a clockwise direction. Thus, the vertical movement of the slide plate 244 (FIG. 6) does not result in movement of the member 272 and the slide 130.

During continuing rotation of the cam 232 by the gears 220 and 228, the roller 236 moves beyond the end of the curved surface 238 on the rocker arm 240, and a roller 284 that is rotatably mounted on the rocker arm 240 engages a raised surface 232a on the cam 232 that pivots the rocker arm 240 in a counterclockwise direction about the stub shaft 242 so that the slide 244 is moved downwardly (FIGS. 6 and 7). As the slide plate 244 moves downwardly, the upper edge of an opening 286 in the slide plate 244 into which lower end portions 256a and 258a of the arms 256 and 258 were previously moved engages these end portions to pivot the arms 256 and 258 in a clockwise direction about the shaft 260. During this movement, the link 270 is pivoted in a counterclockwise direction about the shaft 254 if the protuberance 262a on the cam 262 is not aligned with the lower end of this link. Alternatively, if the cam 262 is in the position shown in FIG. 6, the lower end of the link 270 bears against the protuberance 262a during clockwise movement of the arms 256 and 258 so that the member 272 is moved to the right in FIG. 6 to return the slide 130 to its normal position. This restores the detent assemblies 52 to their normal positions in the manner described above, thereby releasing the accumulator slides 22 and the complementary slides 24 for return movement under the control of their respective drive means.

Referring now more specifically to the operation of the data handling apparatus or cash register which embodies the present invention, the lever 266 is adjusted to the position shown in dot and dash outline in FIG. 6 when information is to be entered into the cash register by manual actuation of the keyboard assembly. With the lever 266 in this position, the selector unit 50 holds the plurality of stop assemblies 54 ineffective during the ensuing cycle of operation of the cash register. A single key 36 in the relevant key banks in the keyboard assembly is then operated to represent the digital information to be entered as well as one or more selecting functions and modes of operation to be performed. The actuation of a single key in the bank associated with one of the differential control units 20 moves a stop element into the paths of movement of a pair of the stop projections 38 and 40 on the complementary and accumulator slides 24 and 22, respectively.

The operation of the cash register is then initiated by any of the means well known in the art so that the main shaft 222 is rotated through a single cycle of rotation. During an initial portion of this cycle of rotation, the cam 232 is driven by the gears 220 and 228 to pivot the rocker arm 240 in a clockwise direction (FIG. 7) so that the slide plate 244 is moved upwardly to engage the roller 252 and to deflect the arms 256 and 258 in a counterclockwise direction (FIG. 6) about the shaft 260. Since the lever 266 is moved to a position to render the selector unit 50 ineffective, the protuberance 262a on the cam 262 is displaced from the path of movement of the lower end of the link 270, and this link pivots in a clockwise direction about the shaft 254 during counterclockwise movement of the arms 256 and 258. Thus, the member 272 is not actuated and the plurality of detent means 52 in the stop assemblies 54 remain in the ineffective position shown in FIG. 11 in which the accumulator slides 22 and the complementary slides 24 in all of the differential control units 20 are free for movement. The control shaft 150 is rotated to free the control slides 144, but this operation is without effect because of the ineffective setting of the selector unit 50.

During an ensuing portion of the cycle of rotation of the main shaft, the drive means described in detail in the copending Englund application pivot the arms 30 and 32 (FIG. 2) in clockwise and counterclockwise directions, respectively, so that the accumulator slides 22 in the units 20 are moved to the left and the corresponding complementary slides 24 are moved to the right. This movement continues in each of the differential control units 20 until the stop portions of the depressed keys are engaged by the opposite edges of a pair of the stop projections 38 and 40. When the movement of the slides 22 and 24 in the differential control units 20 are arrested, the indicator slides or racks 26 are adjusted to positions representing the entered data items, the accumulator slides 22 have been adjusted to data representing positions, and the complementary slides 24 have been adjusted to positions complementary to the settings of the related accumulator slides 22. If desired, during the setting of the accumulator slides 22 or during the resetting movement thereof, one of the accumulating means 42, 44, 46 or 48 can be engaged with the toothed portions 22c so that the data item is entered into the accumulator in addition to being supplied to the indicating and recording means controlled by the indicator racks 26.

During the remainder of the cycle of rotation of the main shaft, the arms 30 and 32 are pivoted in counterclockwise and clockwise directions, respectively, so that the slides 22 and 24 are restored to their normal positions. Although the signal generators 56 in the plurality of differential control units 20 are actuated by the setting and resetting movements of the accumulator slides 22, suitable control means provided in the external circuit render these pulses ineffective. Further, during the terminating portion of the cycle of movement of the main control shaft, the roller 284 engages the inclined surface 232a (FIG. 7) so that the slide plate 244 is returned to its lowermost position. In doing so, the end portions 256a and 258a are engaged by the upper edge of the opening 286 so that these arms are pivoted in a clockwise direction (FIG. 6). Since the protuberance 262a is not aligned with the lower end of the link 270, this movement of the arms 256 and 257 merely restores the link element 270 to the position shown in FIG. 6 without producing any movement of the member 272.

When the cash register is to be controlled to receive a data entry stored in an external control circuit, such as one of the type disclosed in the copending Sundblad application, the lever 266 is adjusted to the position shown in FIG. 6 so that the selector unit 50 is conditioned to render the plurality of stop assemblies 54 effective. Further, the input to the individual data registers in the external circuit are rendered responsive to the signals supplied over the conductors 116, and these registers are rendered effective to return operating signals over the conductors 205 to the clutch assemblies 58 in the units 20. When the external control circuit is prepared for operation, a start signal is supplied to the cash register so that the rotation of the main shaft 222 is initiated.

In the data handling system disclosed in the copending Sundblad application, the data items, such as digital and control information, are stored in complementary binary form in a plurality of registers. Thus, it is necessary to supply a complementary or preliminary pulse to these data registers at the beginning of the cycle of operation of the cash register. To accomplish this, the cash register includes a cam 290 (FIG. 15) connected to a shaft 292 that is driven by the main shaft 222. During an initial movement of the main shaft 222, a protuberance 290a on the periphery of the cam 290 momentarily closes a pair of contacts 294. The momentary closure of the contacts 294 supplies a preliminary signal or complementary pulse to the registers in the external data handling system.

During the next portion of the cycle of rotation of the main shaft 222, suitable drive means actuated thereby rotate the control shaft 150 from the position shown in FIG. 11 to the position shown in FIGS. 12 and 13 in which the notches 158 are moved into alignment with the projecting arms 149 on the control slides or links 144 in the plurality of detent assemblies 52. This permits the tension springs 146 to move the control slides 144 to the position shown in FIG. 12 in which the arms 156 are positioned in alignment with the projecting portions 118b on the plurality of latch arms 118.

Continuing rotation of the main shaft 222 drives the gear 228 to a position in which the follower 236 engages the arcuate surface 238 on the rocker arm 240 so that the slide 244 is again moved upwardly (FIG. 6). During the upward movement, the arms 256 and 258 are again pivoted in a counterclockwise direction about the shaft 260. This moves the lower end of the link 270 into engagement with the protuberance 262a on the cam 262 so that the upper end of the link 270 moves in a counterclockwise direction about the shaft 254. This shifts the member 272 to the left (FIG. 6) or upwardly (FIG. 5) so that the link 130 is moved upwardly. This movement of the link 130 shifts the plurality of latch arms 118 to the position illustrated in FIG. 12 in which the projecting portions 118b engage the upstanding arms 156 and the depending fingers 128 are positioned in alignment with the ends of the complementary slides 24. Thus, movement of the complementary slides 24 to the right in FIGS. 1 and 2 and downwardly in FIG. 12 is blocked.

During the next portion of the cycle of rotation of the main shaft 222, the drive means attempts to pivot the arms 30 and 32 in opposite directions. However, since movement of the complementary slides 24 is blocked by the depending fingers 128 on the latch arms 118, only the accumulator slides 22 in the units 20 are moved to the left (FIGS. 1 and 2). During this movement, the cam follower arms 60 and 62 are pivoted in opposite directions to move the contact elements 82 and 84 into and out of engagement with the contact elements 106. Thus, the signal generators 56 supply a series of pulses proportional to the movement of the accumulator slides 22 to the associated ones of the registers in the external data handling system.

As soon as each of these registers has been supplied with a number of signals corresponding to the entry stored in the register, energizing signals are supplied over the related conductors 205 so that the solenoids 204 in the clutch assemblies 58 are energized. The energization of the solenoid 204 moves the armature 212 upwardly from the position shown in FIG. 8 to the position shown in FIG. 9 so that the clutch arm 194 is pivoted in a counterclockwise direction to move the end portion 194a thereof into one of the plurality of depressions or recessed areas 181–189. The continuing movement of the accumulator slide 22 moves the related control slide or link 144 to the left in FIGS. 1 and 2 to the position illustrated therein. In so moving, the arm 156 on the control slide 144 is moved out of alignment with the projecting portion 118b on the latch arm 118 so that the tension spring 136 pivots this latch arm in a counterclockwise direction about the pivot pin 120 to the position shown in FIG. 13.

In this position, the depending finger 128 is moved out of alignment with the complementary slide 24 and into engagement with the toothed portion 22d on the related accumulator slide 22. In the event that the tension spring 136 does not completely shift the position of the latch arm 118 to that shown in FIG. 13, the tapered and inclined end 24a of the complementary slide 24 is effective during the ensuing downward movement of this slide to cam the arm 118 to its proper position. Thus, the complementary slide 24 is free to move to a position that is complementary to that in which the related accumulator slide 22 is now secured by the latch arm 118.

When the control slide 144 is moved by the accumulator slide 22, the clutch arm 194 is shifted to the position illustrated in FIG. 10 in which the tension spring 214 pivots this arm in a clockwise direction out of engagement with one of the depressions 181–189. Thus, the control slide 144 is disconnected from the accumulator slide 22. However, the tension spring 146 is not effective to restore the control slide 144 to the position shown in FIG. 12 inasmuch as the lower edge (FIG. 13) of the arm 156 now engages the upper end of the latch arm 118. Since the accumulator slide has been set in its proper position by the detent means 52 under the control of the clutch assembly 58, it is not necessary to continue the energization of the solenoid 204 under the control of the related register in the external data handling system.

During the next portion of the cycle of rotation, the control shaft 150 is returned to the position illustrated in FIG. 11 to lock the control slides 144 in their normal position. Further, the surface 232a on the cam 232 is moved into engagement with the roller 284 so that the rocker arm 240 is pivoted in a counterclockwise direction to move the slide plate 244 downwardly (FIG. 7). During this movement, the upper edge of the opening 286 engages the lower end portions 256a and 258a on the arms 256 and 258 so that these arms are pivoted in a clockwise direction (FIG. 6). This movement shifts the shaft 254 to the right so that the engagement of the lower end of the link 270 with the protuberance 262a shifts the upper end of this link to the right to cause a corresponding movement of the member 272 and the slide 130. When the slide 130 moves downwardly in FIG. 5 or to the right in FIGS. 11–13, the bight portion of the cross-pieces 132 engages the rounded protuberances 118c to pivot the plurality of latch arms 118 in a clockwise direction.

During this movement, the depending fingers 128 are withdrawn from the toothed portions 22d on the accumulator slides 22 and pass through the recessed areas 160 on the displaced complementary slides 24 to be restored to the normal position illustrated in FIG. 11. In this position, both of the slides 22 and 24 are free for movement in opposite directions. Accordingly, during the remaining portion of the cycle of rotation of the main shaft, the accumulator slides 22 are moved to the right and the complementary slides 24 are moved to the left (FIGS. 1 and 2) to restore them to their normal positions. During this movement, the signal generators 56 are operated to supply signals to the related control circuits. However, these signals are not effective.

When one of the values stored in the external data control system is "0," the related control unit 20 operates in a somewhat different manner than that described above. More specifically, when the main shaft of the cash register is placed in rotation, the complementary or preliminary pulse provided by the contact 294 causes any register storing a value "0" to immediately supply an operating signal to the conductor 205 so that the solenoid 204 in the related clutch assembly 58 is energized. This immediately moves the armature 212 in the energized solenoid 204 from the position shown in FIG. 8 to the position shown in FIG. 9 to pivot the clutch arm 194 in a counterclockwise direction. Since one of the depressions 181–189 is not aligned with the projecting portion 194a on the clutch arm 194, this movement of the armature 212 wedges the projecting portion 194a against the outer surface of the related accumulator slide 22 to lock the control slide 144 on which the actuated clutch arm 194 is mounted in a fixed position. Accordingly, when the control shaft 150 is rotated to the position shown in FIGS. 1, 2, 12 and 13, the control slide 144 in a differential control unit 20 associated with the external register storing the value "0" is locked against movement by the tension spring 146. Thus, the arm 156 remains held in position out of alignment with the projecting portion 118b on the latch arm 118.

When the slide 130 is subsequently shifted to the left, the latch arm 118 in the differential control unit 20 associated with a "0" storing register moves directly from the position shown in FIG. 11 to the position shown in FIG. 13. In this position, the depending finger 128 engages the toothed portion 22d to lock the accumulator slide 22 against any movement and frees the related complementary slide 24 for a full movement. Thus, the accumulator slide 22 can not be moved when the drive means therefore is subsequently rendered effective and the complementary slide 24 moves through its entire range of movement. The solenoid 204 can be released under the control of the related register in the external data control system as soon as the slide 130 has been set. The cash register is restored to a normal condition in the manner described above.

When the differential control units 20 are to be actuated to settings determined by a selected one of the accumulating means 42, 44, 46 or 48, either for the purpose of setting the indicator racks or slides 26 or for transferring an entry to the external data handling system, the lever 266 is adjusted to the position shown in solid line in FIG. 6 and a selected one of the accumulating means is rendered effective by preparing one set of accumulator gears similar to the gear 170 for movement into engagement with the toothed portions 22c on the accumulator slides 22. The cash register is then placed in operation by initiating a cycle of rotation of the main shaft 222. When the contacts 294 are closed by the cam 290, the signal provided thereby is rendered ineffective as described in detail in the copending Sundblad application because this pulse does not serve any useful function when the accumulator slides 22 are being adjusted to settings determined by the accumulating means in the cash register.

During the next portion of the cycle of rotation of the main shaft 222, the selected set of accumulator gears are moved into engagement with the toothed portion 22c of the accumulator slide 22, the control shaft 150 is rotated to free the control slides 144 for movement to the position shown in FIG. 12, and the selector unit 50 operates in the manner described above to shift the slide 130 to the position shown in FIG. 12 so that the projecting portions 118b on the latch arms 118 engage the projecting arms 156 on the control slides 144. The depending fingers 128 on the latch arms 118 now block movement of the complementary slides 24 so that when the drive means is rendered effective under the control of the main shaft, only the accumulator slides 22 are moved to the left (FIGS. 1 and 2).

As the elongated teeth 174 on the accumulator gears 170 move to the "0" position, the lower ends of the depending arms, such as the end portion 168a, are engaged by the enlarged teeth 174 to shift the control slide 144 to the left (FIGS. 1 and 2). This moves the arms 156 out of engagement with the projecting portions 118b on the related latch arms 118 so that these arms shift to the position shown in FIG. 13 in which the related complementary slide 24 is freed for movement and the accumulator slides 22 are locked against further movement. During this movement of the accumulator slides 22, the signal generators 56 are operated to supply series of pulses corresponding to the steps of movement of the slides so that the values standing in the selected accumulating means are transferred to the external data handling system.

During the ensuing movement, the arms 30 now move the complementary slides 24 to their complementary positions and thus complete the setting of the indicator racks or slides 26 to positions corresponding to the items previously stored in the accumulator. During the ensuing operations, the detent assemblies 52 are rendered ineffective by the selector unit 50, the control shaft 150 is restored to its normal position to lock the control slides 144 in the position shown in FIG. 11, and the accumulating means are disengaged. If the accumulators are to be reset, the accumulator gears 170 are disengaged in the "0" position to which they are adjusted by the accumulator slides 22. Alternatively, if the entries stored in the accumulating means is to be returned thereto, the gears 170 remain engaged during the resetting movement of the accumulator slides.

Although the present invention has been decsribed with reference to a single embodiment thereof, it should be understood that numerous other modifications and embodiments can be devised by those skilled in the art that will fall within the spirit and scope of the principles of this invention.

What is claimed and desired to be secured by Letters Patent of the United States is:

1. In a data handling system, a pair of differentially settable elements connected for complementary movement to different data representing positions, detent means normally preventing movement of one of said elements, means for moving the other of said elements to a position representing an entered data item, and control means operable in response to movement of said other element to said entered data item reprsenting position for operating said detent means to arrest further movement of said other element and to free said one element for movement.

2. The apparatus set forth in claim 1 including signal generating means operated by the movement of one of said elements for providing a signal representing the entered data item.

3. In a data handling apparatus, a single order differential means including a pair of differentially settable elements movable to complementary positions, detent means for normally preventing operation of one of said elements, means for moving the other of said elements, a link for controlling said detent means, and control means for connecting said link to said other element so that movement of said other element moves said link to release said detent means thereby to release said one element for movement.

4. In a data handling appratus, a pair of differentially settable elements operable in opposite directions to different complementary settings representing different entered data items, detent means normally preventing movement of one of said elements, means for moving the other of said elements to a position representing a data item to be entered, release means for releasing said detent means to permit movement of said one element, and means operated by movement of said other element to said position for actuating said release means.

5. In a data handling apparatus, a single order differential means including a pair of differentially settable elements operable to different complementary positions representing different data items, detent means normally preventing movement of one of said elements, means for moving the other of said elements to a position representing an entered data item, a release mechanism for rendering said detent means ineffective, and means for selectively connecting said other element and said release mechanism so that said other element actuates said release mechanism.

6. In a data handling apparatus, a pair of settable elements movable to complementary data representing positions, detent means normally blocking movement of one of said elements, a movable link for controlling said detent means, an arm pivotally mounted on said link, means for moving the other of said elements, and means for pivoting said arm into engagement with said other element so that said link is moved by said other element, said detent means being operated by said movement of said link to release said one element and to arrest movement of said other element.

7. In a data handling apparatus, a pair of settable slides, means mounting said slides for oppositely directed translatory movement, a link mounted for translatory movement generally parallel to said settable slides, a latch arm resiliently biased into engagement with said link and disposed in the path of movement of one of said slides so as to block movement of said one slide, and means for selectively coupling the link to the other of said slides so that said link is moved by said other slide, movement of said link permittting said latch arm to move out of the path of movement of said one slide and into the path of movement of said other slide.

8. The data handling apparatus set forth in claim 7 including at least one settable accumulator means for controlling the movement of said settable slides, and means including said accumulator means for moving said link.

9. The data handling apparatus set forth in claim 7 including resetting means for moving said latch arm out of the paths of movement of both of said slides.

10. In a data handling apparatus including digit accumulating means and digit indicating means, a differentially settable element movable through successive increments of movement for controlling the entry of digital data into said digit accumulating means and said digit indicating means, said settable element including first and second control surfaces, a signal generator mounted in a fixed position relative to said element and including operator means engaging said first control surface for operating said signal generator to generate an electric signal for each increment of movement of said settable element, and stop means for arresting movement of said element and including means for engaging said second control surface.

11. The data handling apparatus set forth in claim 10 in which the differentially settable element includes a third control surface, latch means movable into and out of engagement with the third control surface to provide additional means for arresting movement of the differentially settable element, and solenoid means for controlling movement of the latch means into and out of engagement with the third control surface.

12. A data handling apparatus comprising a differentially settable element including a signal generating surface and stop means, means for moving said settable element through successive increments of movement to a position representing an entered data item, a signal generator including means engaging said signal generating surface for operating said signal generator to generate a signal for each increment of movement to represent said entered data item during movement of said element, and detent means including a latch element engageable with the stop means on said element and a solenoid for controlling the movement of said latch element into engagement with said stop means to arrest movement of said element.

13. In a data handling apparatus, a differentially settable element including a plurality of spaced control surfaces, means for moving said element, a movably mounted arm disposed adjacent the path of movement of said control surfaces, stop means controlled by said arm, and a solenoid operable to move said arm into engagement with one of said control surfaces so that said element operates said stop means through said arm to arrest movement of said element in a selected data representing position.

14. In a data handling apparatus, a differentially movable element including a plurality of control surfaces spaced in the direction of movement of said element, detent means for arresting movement of said element, a movable linkage for controlling said detent means, a movably mounted arm included in said linkage and disposed adjacent the path of movement of said control surfaces, and a solenoid for moving said arm into engagement with one of said control surfaces so that said element actuates said linkage to operate said detent means to arrest movement of said element.

15. In a data handling apparatus, a differentially settable element, control means for moving said element through different distances representing different data items, an irregular surface on said element, and signal generating means mounted in a fixed position relative to the path of movement of said element and including both contact means mounted in a fixed position and contact actuating means engaging said contacts, said contact actuating means engaging said irregular surface and being operated by said irregular surface during movement of said element for generating a signal representing the distance through which said element is moved.

16. A data handling apparatus comprising a differentially settable element, said element including undulating cam track means, a pair of cam followers engaging said cam track means at positions spaced from each other, a signal generator controlled by said followers and operable to supply an output signal in response to relative movement between said followers, and means for moving said element so that said cam track means moves said followers relative to each other to control said signal generator.

17. A data handling apparatus comprising a differentially settable element, said element including an undulating cam track, a pair of movably mounted cam follower arms each including a portion engaging said cam track, said cam follower arms engaging said cam track at positions spaced 180° from each other relative to the undulations in said track, a pair of spaced and aligned electrical contact means each carried on one of said cam follower arms, and means for moving said element to periodically move said pair of contact means into engagement.

18. In a data handling apparatus, a single order differential means including a pair of differentially settable elements movable to different complementary positions representing different entered data items, detent means normally preventing movement of one of said elements, a data accumulator including a settable accumulator means, means including said settable accumulator means for adjusting the other of said elements to a data item representing position, release means operable to actuate said detent means to an ineffective position in which said one element is free to move, and means including said settable accumulator means for operating said release means.

19. In a date handling apparatus, a single order differential means including a pair of differentially settable elements movable to different complementary positions representing different data items, detent means normally operable to prevent movement of one of said elements, key controlled means for controlling the movement of the other of said elements to a position representing an entered data item, a data accumulating means including a settable accumulator member for controlling the movement of said other element to a position representing an entered data item, first means operable when said other element is moved under the control of said key controlled means for releasing said detent means, and second means controlled by said data accumulator for releasing said detent means.

20. A data handling apparatus comprising a pair of differentially settable elements movable to complementary positions representing different data items, key controlled means for controlling the adjustment of said pair of elements to complementary positions representing an entered data item, electrically controlled means for controlling the adjustment of said pair of elements to complementary positions representing an entered data item, said electrically controlled means including detent means for causing sequential movement of said pair of elements to said complementary positions, and selector means for controlling the operability of said detent means.

21. In a data handling apparatus, a differentially settable element movable to different spaced positions representing different data items, detent means for arresting movement of said element, a control element movable between a first position in which said detent means is rendered effective to arrest movement of said settable element and a second position in which said detent means is rendered ineffective to arrest movement of said settable element, first means for normally holding said control element in said first position and for releasing said control element for movement to said second position when said apparatus is placed in operation, and second means controllable to hold said control element in said first position when said control element is released for movement to said second position by said first means.

22. In a data handling apparatus, a single order differential means including a pair of differentially settable elements operable to different complementary positions representing different data items, drive means for moving said elements to complementary positions representing a data item, signaling means controlled by one of said elements for providing electrical signals representing said data item, and indicator means controlled by both of said elements for providing an indication of said data item.

23. The apparatus set forth in claim 22 including a control assembly for sequentially locking first one and then the other of said elements against movement so that said elements can be moved only in sequence by said drive means.

24. In an accounting machine, a supporting frame, a differential means movably mounted on said frame and movable through successive increments of movement to data representing positions, signal generating means mounted on said frame and including a pair of relatively movable contact means, key means for controlling the movement of said differential means to said data representing positions, accumulator means for controlling the movement of said differential means to said data representing positions, a control structure on said differential means, and a mechanical linkage carried on said frame and connected between said control structure and said pair of contact means, said mechanical linkage including means for moving said pair of contact means relative to each other in response to each increment of movement of said differential means so that said signal generating means produces a number of signals during movement of said differential means that represents the amount of movement of said differential means.

25. In an accounting machine operable to perform listing operations and reading and resetting operations, differentially settable means movable to spaced digit representing positions, key controlled means operable during listing operations to control the movement of said differentially settable means, detent means for arresting movement of said differentially settable means, control means operable to hold said detent means in an ineffective position during listing operations and operable to condition said detent means for movement to an effective position during reading and resetting operations, accumulating means operable to receive data from said differentially settable means during listing operations and operable to control the movement of said differentially settable means during reading and resetting operations, and linkage means controlled by said accumulating means during reading and resetting operations for operating said detent means to an effective position to arrest movement of said differentially settable means when said differentially settable means is operated to a position corresponding to the data stored in the accumulating means and when said detent means has previously been conditioned for this movement by said control means.

26. In an accounting machine operable through a cycle of operation, a plurality of differential means each including a pair of differential elements movable to complementary data representing positions, a plurality of detent means each operable to control the sequence in which the differential elements in one differential means are moved, a control member operable to different positions, sensing means for detecting the position of said control member during each cycle of operation, and means controlled by said sensing means for selectively rendering said plurality of detent means effective and ineffective during different cycles of operation in dependence on the detected position of said control member.

27. In an accounting machine operable through a cycle of operation, a plurality of differential means each including a pair of differential elements movable to complementary data representing positions, a plurality of detent means each operable to control the sequence in which the differential elements in one differential means are moved, linkage means normally holding said detent means in ineffective positions between cycles of operation of said machine and operable to move said detent means to effective positions during a cycle of operation of said machine, control means operable to different positions, sensing means for detecting the position of said control means during a cycle of operation, and means controlled by said sensing means for operating said linkage means.

References Cited in the file of this patent
UNITED STATES PATENTS

| | | |
|---|---|---|
| 1,975,694 | Knotz | Oct. 2, 1934 |
| 2,084,445 | Kottmann | June 22, 1937 |
| 2,226,919 | Gubelmann | Dec. 31, 1940 |
| 2,360,615 | Mixer | Oct. 17, 1944 |
| 2,757,862 | Boyden et al. | Aug. 7, 1956 |
| 2,767,907 | Schwend | Oct. 23, 1956 |
| 2,783,939 | Boyden et al. | Mar. 5, 1957 |